(12) United States Patent
Smith

(10) Patent No.: US 8,161,558 B2
(45) Date of Patent: Apr. 17, 2012

(54) NETWORK MANAGEMENT AND ADMINISTRATION

(75) Inventor: Richard James Smith, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 1671 days.

(21) Appl. No.: 11/411,685

(22) Filed: Apr. 25, 2006

(65) Prior Publication Data
US 2006/0248186 A1    Nov. 2, 2006

(30) Foreign Application Priority Data
Apr. 27, 2005    (GB) .................................. 0508476.9

(51) Int. Cl.
*H04L 29/06* (2006.01)
(52) U.S. Cl. ................. 726/25; 726/22; 726/23; 726/24; 713/188; 709/224; 709/225; 709/227; 709/229
(58) Field of Classification Search .................... 726/10, 726/12, 22–25; 709/223–229; 714/37–39; 713/188
See application file for complete search history.

(56) References Cited

U.S. PATENT DOCUMENTS

| | | | |
|---|---|---|---|
| 5,960,170 A * | 9/1999 | Chen et al. ........................ 714/38 |
| 6,205,551 B1 * | 3/2001 | Grosse ............................. 726/25 |
| 6,219,803 B1 * | 4/2001 | Casella et al. .................... 714/38 |
| 6,324,656 B1 | 11/2001 | Gleichauf et al. |
| 6,499,107 B1 | 12/2002 | Gleichauf et al. |
| 6,546,493 B1 * | 4/2003 | Magdych et al. ................ 726/25 |
| 7,181,412 B1 | 2/2007 | Fulgoni et al. |
| 7,260,837 B2 | 8/2007 | Abraham et al. |
| 7,451,488 B2 * | 11/2008 | Cooper et al. ................... 726/25 |
| 7,493,655 B2 | 2/2009 | Brown |
| 2003/0204632 A1 * | 10/2003 | Willebeek-LeMair et al. .............................. 709/249 |
| 2003/0233581 A1 * | 12/2003 | Reshef et al. .................. 713/201 |
| 2004/0019518 A1 | 1/2004 | Abraham et al. |
| 2004/0088581 A1 | 5/2004 | Brawn et al. |
| 2004/0117401 A1 * | 6/2004 | Miyata et al. ............... 707/104.1 |
| 2005/0010821 A1 * | 1/2005 | Cooper et al. ................ 713/201 |
| 2005/0229255 A1 * | 10/2005 | Gula et al. ....................... 726/23 |
| 2005/0278777 A1 * | 12/2005 | Loza ................................. 726/4 |
| 2007/0233883 A1 * | 10/2007 | De Lutiis et al. ............. 709/229 |
| 2007/0276940 A1 | 11/2007 | Abraham et al. |
| 2009/0112703 A1 | 4/2009 | Brown |

FOREIGN PATENT DOCUMENTS

| | | |
|---|---|---|
| GB | 2414889 | 12/2005 |
| WO | WO 0125870 A2 * | 4/2001 |
| WO | WO2004065330 | 9/2001 |

OTHER PUBLICATIONS

Internet/Intranet firewall security—policy, architecture and transaction services: Author: Ray Hunt; Publication Date: Apr. 3, 1998; Publisher: University of Canterbury.*
Microsoft Computer Dictionary by Microsoft Corporation; Publisher: Microsoft Press; Date: May 1, 2002; Edition: Fifth.*

* cited by examiner

*Primary Examiner* — Taghi Arani
*Assistant Examiner* — Madhuri Herzog

(57) ABSTRACT

Method and arrangements are provided for use in managing a network having one more user computing entities and one or more administrative computing entities. One method includes monitoring network traffic from a user computing entity; detecting a client request sent from the user computing entity, and scanning the user computing entity for vulnerabilities.

19 Claims, 5 Drawing Sheets

NETWORK MANAGEMENT AND ADMINISTRATION

RELATED APPLICATIONS

This application for letters patent is related to and claims the benefit of an earlier filing date and right of priority of foreign filed patent application GB0508476.9, filed in the United Kingdom on Apr. 27, 2005, which is also hereby incorporated by reference.

BACKGROUND

With that ever expanding use of computers, there is a continuing need for methods and arrangements for use in the administration and management of computer and/or network resources to reduce vulnerability of such computing resources or entities to malicious code. Examples of networks of this kind range from a domestic network involving, for example, a couple of interconnected computers, to an intranet of a commercial organisation having a relatively large number of computers on a Local Area Network (LAN).

BRIEF DESCRIPTION OF DRAWINGS

Certain exemplary embodiments of the present invention will now be described, by way of example, and with reference to the accompanying drawings, in which.

DETAILED DESCRIPTION

Figure 1:
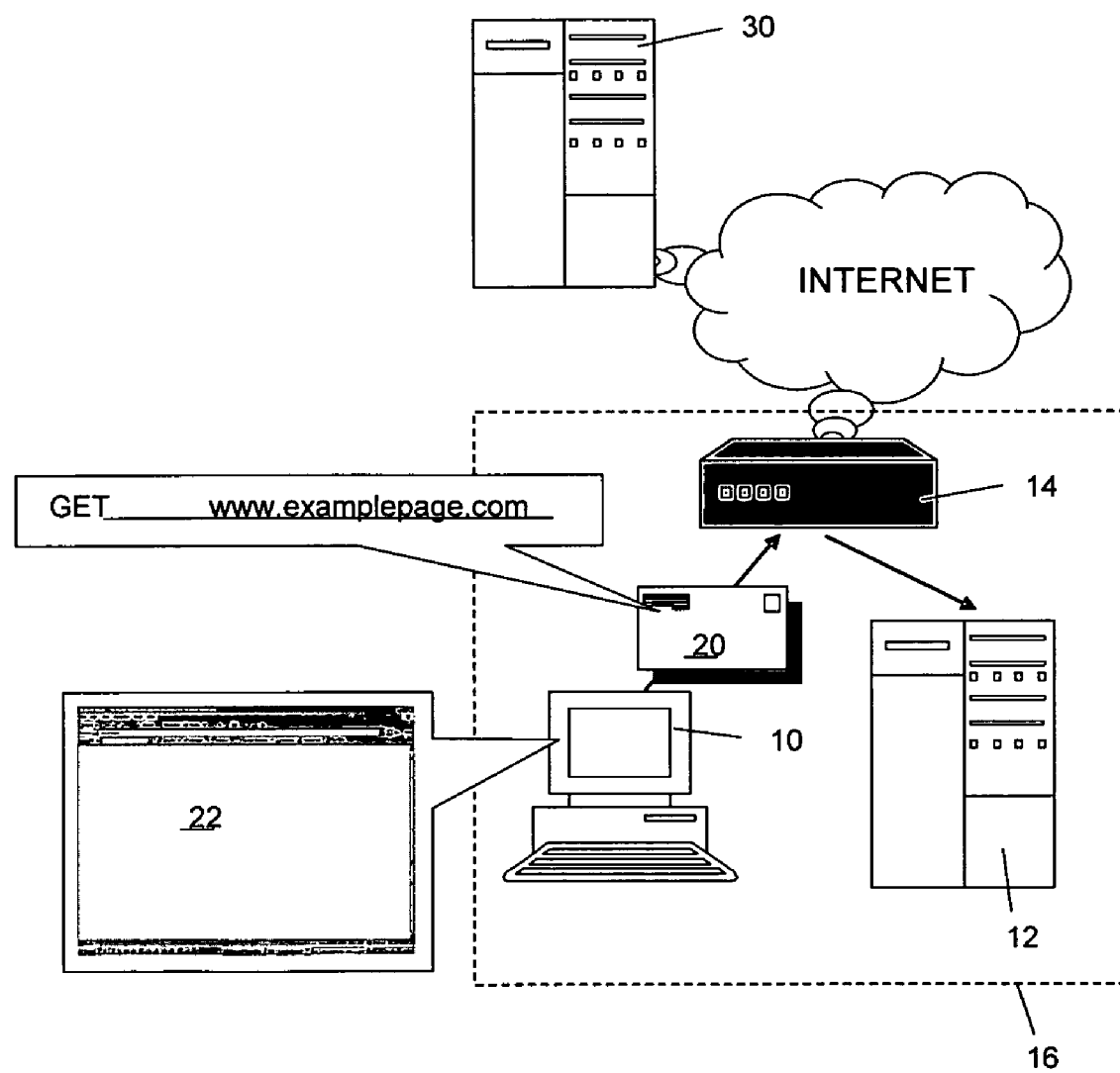
FIG. 1 is a schematic illustration of a scenario in which vulnerability scanning may take place in accordance with an exemplary embodiment.

Referring now to FIG. 1, a network, includes a plurality of computing entities, including user computer 10 ("user") connected to an administrative computer 12 ("administrator") via a router 14. The term 'computing entity' is intended to encompass any entity which is capable of performing computation separately to any other entity. Thus, for example, different software applications running on the same computer may be thought of as separate entities, just as two different computers may be. In this example the user 10 is a PC and the administrator 12 is an array of rack-mounted computing elements, most usually located in an air-cooled data-centre. This represents the most usual hardware configuration of each of these entities, a large network typically having many relatively low-cost PCs and relatively few high-cost rack-mounted computing elements. It is to be understood, however, that the epithets 'user computer' and 'administrative computer', or 'user' and 'administrator' are here solely indicative of the role of the computer concerned at any given point in time. They do not connote any particular hardware configuration. Thus, it is equally possible for an administrator to be a PC (for example the 'personal' PC of an employee whose job it is to administer the network—when performing an administrative task), and for the user to be an array of rack-mounted computing elements, depending upon the context. In the present example, the network is an intranet 16 of a commercial organisation. A network within the meaning ascribed in the present specification may, however, be constituted simply by the interconnection of two computers with or without interstitial network infrastructure such as hubs, switches and routers.

The administrator 12 runs a daemon 200 (illustrated schematically in FIG. 2) whose function is the detection of vulnerabilities on the user 10 to malicious code, and in particular, vulnerabilities which users have when acting in the role of a client. Additionally, and in accordance with an exemplary mode, the daemon performs a remedial function, ameliorating the vulnerability. At its most basic level the daemon 200 monitors the user 10 to establish if and when it is operating in the role of a client (that is to say when the user is requesting a service from another computing entity). When the daemon detects this it causes the administrator to evaluate and, where appropriate, to scan the user for 'client-side' vulnerabilities— vulnerabilities to malicious code exhibited by the user when acting in the role of a computing entity which is requesting a service from another computing entity. Accordingly, the term 'client' is used to ascribe a role in an interaction between two computing entities. Thus, for example, a software application running on one computer and requesting a service from a software server running on some other computer can be described as a client.

Figure 2:
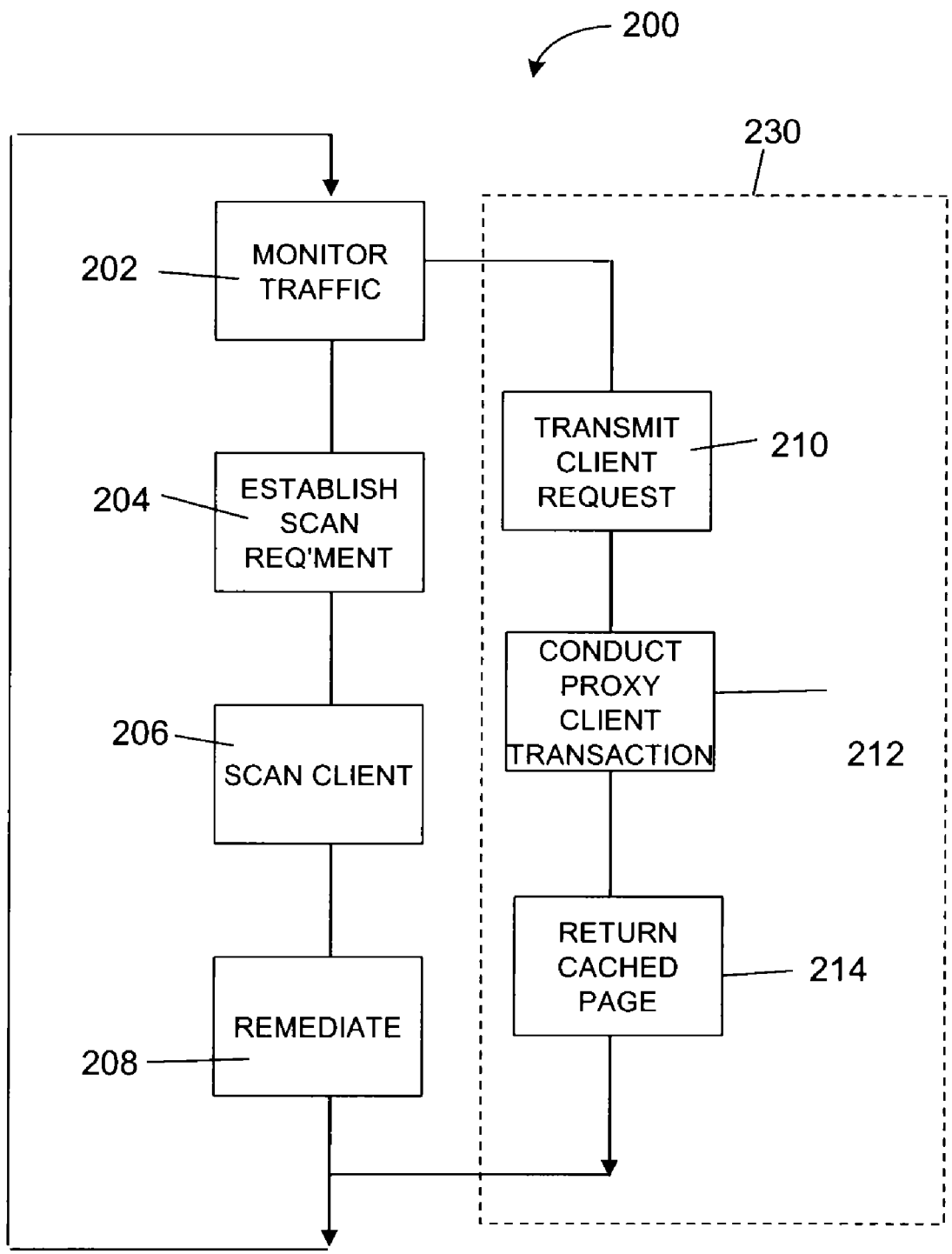
FIG. 2 is a flowchart illustrating procedures involved in administering a client vulnerability scan in accordance with an exemplary embodiment.

Referring now to the scenario illustrated schematically in FIG. 1, together with the flowchart of FIG. 2, client software running on the user 10 initiates a client request 20. In the present example the request is an http: GET request, for a specified web page, generated from the interface 22 of a web-browser program (such as Internet Explorer) in user 10. The specified web page (e.g., www.examplepage.com) is hosted on a computer 30 located outside of the intranet 16. This request 20 is transmitted to the router 14. Simultaneously, the daemon 200 is running on the administrator 12, and at step 202, network traffic (such as, for example, data packets) passing through one or more specified nodes in the network is monitored. In the present illustrated example the administrator 12 is monitoring traffic through a single node provided by the router 14. At its most basic, this monitoring can be achieved by configuring the router 14 simply to duplicate all data packets transmitted to the router 14 by the user 10 and to transmit those duplicated packets to the administrator 12 for evaluation. Such a regimen would provide the most thorough monitoring, but may generate a relatively large amount of additional network traffic, particularly where, as is likely to be the case in large commercial intranets, many users 10 are being monitored by a single administrator 12.

In one exemplary embodiment the router 14 is configured to relay only certain categories of data packet to the administrator 12 for evaluation. The precise nature of the packets which are to be monitored depends upon the range of traffic which is defined, in accordance with a predetermined policy, as evidencing client-role behaviour from its provenance. The policy may, in turn, be determined by the risk presented by a particular form of client operating on a user. One way in which categories of outgoing packet can be defined for monitoring is by protocol, because protocols have well-defined elements of interaction (known in the art as 'methods'). It is, therefore, possible to categorise client-role behaviour with relatively high precision by specifying certain protocol methods as indicating such behaviour. In the present example, all outgoing packets which form an http: GET request—clearly indicative of client-role behaviour by their originator—are monitored, and so are duplicated and transmitted to the administrator 12. Implementation of other protocol methods, and at different levels in the networking hierarchy of protocols (known as the networking stack), such as TCP/IP, can be specified, in addition or in substitution, as evidencing client behaviour.

It should be noted that, in the present example, traffic passing through a network node provided by router 14 is monitored by an administrator 12 remote from that node. Accordingly the exemplary monitoring process implicitly involves at least two parts: determining whether the traffic is of a form defined as being indicative of a client request; and the relaying of traffic having that form to the administrator 12. In this exemplary embodiment, the routers may be relatively inexpensive elements of network infrastructure which can relay certain categories of traffic elsewhere, enabling many nodes to be monitored by fewer, more costly, administrators. It would, however, equally be possible for an administrator to be situated at the network node through which traffic is monitored, thus obviating the need to relay traffic to the administrator 12. Another exemplary embodiment involves the use of a proxy—e.g., a transparent proxy, at the appropriate network node to monitor the traffic.

Once relevant traffic has been relayed to the administrator 12, the daemon operates, at step 204, to determine whether the user 10 from whom the client request originated should be scanned for vulnerabilities. Although vulnerabilities are primarily associated—at least on the minds of their human operators—with a hardware computing entity such as a specified PC, particular client-side vulnerabilities exhibited by a given computing entity depend principally upon the software which causes that computing entity to operate in the client role. Accordingly each software application capable of causing a given computing entity to operate in the client-role may be considered as a separate client. In addition, ostensibly identical software applications running on different hardware computing entities may be similarly treated as separate and distinct clients.

It therefore follows that it is possible to infer a reliable and singular identifier for a software client by pairing (i) a unique identifier for the computer on which the software client is running with (ii) information identifying the software client. Accordingly step 204 of the daemon is implemented by extracting the following information from the traffic relayed to the Administrator 12:

1. The Media Access Control (MAC) address (also known as Ethernet Address) of the user 10. This is a physical address unique to a particular ethernet controller board (also known as a network card) within the user 10. The MAC address therefore reliably identifies a particular computing entity. It is found in the data packets which implement the Address Resolution Protocol (ARP).
2. The identity of the client software application on whose behalf the GET request was generated. This can be established, for example in the case of a web browser client, from the User Agent String which, in accordance with HTTP is carried in a GET request and identifies the software client (typically by manufacturer and name, e.g. Mozilla Firefox), its version and which, if any, of the manufacturer's updates have been incorporated.

Figure 3:
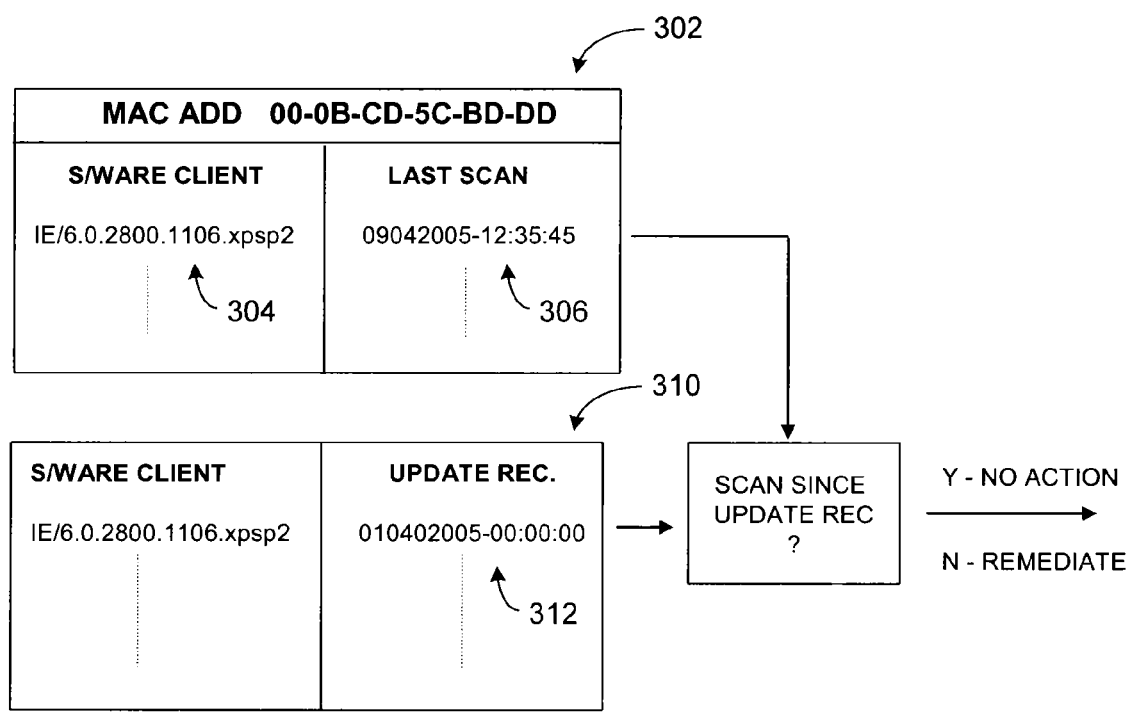
FIG. 3 is a schematic illustration of tables employed to evaluate vulnerability in accordance with a predetermined policy in accordance with an exemplary embodiment.

Referring additionally to FIG. 3, to establish whether a particular software client should be scanned, the daemon 200 maintains a plurality of tables 302, one for each user 10, identified by its MAC address. The table 302 lists software clients which run on the user 10 (identified by MAC address 00-0B-CD-5C-BD-DD), against a timestamp indicating the time (if any) of the last occasion on which that client was scanned for vulnerabilities. Thus, in the example of the table 302, entry 304 indicates that user 10 is running Internet Explorer version 6.0.2800.1106 for the operating system Windows XP®, as upgraded by Service Pack 2 (contained in the character string IE/6.0.2800.1106.xpsp2); the inferentially unique identifier for this client is thus:

{00-0B-CD-5C-BD-DD/IE/6.0.2800.1106.xpsp2}

The daemon 200 then looks up that particular genus of software client, i.e. IE/6.0.2 . . . , in a vulnerability log 310 to establish whether known vulnerabilities in that genus of client have been logged (e.g. as a result of a notification from the manufacturer, or from an independent source) since the time of the most recent vulnerability scan of client {00-0B-CD-5C-BD-DD/IE/6.0.2800.1106.xpsp2}. This is done simply by comparing the date 312 of the last entry in the vulnerability log with the timestamp 306 of the last scan for vulnerabilities of the client 00-0B-CD-5C-BD-DD/IE/6.0.2800.1106.xpsp2. If the client has been scanned since the most recent entry then, in accordance with a predetermined policy, an assumption is made that no scan is desired.

Identification of a client in the above example has been described using the MAC address. However, this address does not necessarily persist in packets transmitted beyond a local subnet. For instances where the MAC address is not available, other identifiers may include, for example, the IP address of the hardware on which the client is running, the user name of an individual operating the hardware; where the operator is using a trusted platform, the ID to log into that, or, for example the BIOS ID of a PC may be used.

The present embodiment as illustrated in FIG. 3 implements merely one example of a network administration policy with regard to the selection of clients for vulnerability scanning. The policies may be with the aim of reducing vulnerabilities to an acceptable level (whatever that level may be) at an acceptable cost. The rigour enforced by the policy may relate to the commercial importance of the network, or certain users of it. Thus, in one embodiment, all clients are scanned upon detection of a client request. In a further embodiment, clients are scanned only if more than a predetermined period of time has elapsed since the most recent scan. This has the advantage of being simpler to administer than the example illustrated above, but may, as a result, incur unnecessary scans, or fail to scan when necessary and/or desired. In yet a further embodiment, different genus' of clients are scanned at different frequencies. Thus, in accordance with this embodiment, clients which classically exhibit high vulnerability levels, such as Internet Explorer for example, may be set for scanning if they have not previously been scanned within the past week, whereas less vulnerable clients such as Mozilla Firefox may be scanned if not scanned within the previous month, for example.

Referring once again to FIGS. 1 and 2, once the administrator has established that a vulnerability scan should be performed, it may then be useful to scan the client in question, and this is performed at step 206. The precise nature of the operations involved in a vulnerability scan vary from one software client to another. In the case of Internet Explorer, for example, one potential vulnerability is the possible exposure of files held on the user which are not intended to be accessible, either to the software client or to a server transacting with the client. Thus one way of scanning the client is, for the administrator to perform the role of a transparent proxy server, which injects additional packets into the data transmitted from the external computer 30, the packets having the effect of, for example, seeking to gain access to such a file— for example a Windows system file. If the client allows access to that file, then it is, self-evidently, vulnerable.

Scanning for client-side vulnerabilities need not be limited to particular vulnerabilities which are known to be exhibited by the client identified from the user agent string. For example, a more generic and broad-ranging scan may be performed. Thus, for example, when a client is detected on the basis of requesting a method of a particular protocol, such as HTTP, that client may be scanned for all vulnerabilities associated with that and similar protocols, or protocols which include the same or similar methods (eg HTTPS). Similarly, in the case of a mail client, detected operating using the IMAP protocol, the client may be scanned also for vulnerabilities associate with the POP protocol as well.

Additionally, the scanning described takes place at application protocol level in the network stack. There is, however, no reason why client-side behaviour may not be detected and/or scanned at other levels in the stack (eg TCP/IP), either in addition to, or in substitution for detection and/or scanning (as the case may be) of client-side behaviour at application protocol level.

Following the scanning operation at step 206, if it is determined that the client is vulnerable in some manner, the administrator performs one or more remedial actions at step 208. The nature of any remedial actions may vary in dependence upon the nature of the vulnerability they're seeking to remedy, as well as the security policy. Thus, one form of remedial action, where possible, may involve the administrator patching the vulnerability in the client (for example by exploiting the vulnerability in question to load and install a remedial software patch remotely).

For other remedial actions, it may simply involve notifying the operator of the user 10 that his machine is vulnerable, the nature of the remedial action required to be taken, and where the vulnerability is regarded as sufficiently serious, disconnecting the user 10 from the network pending performance of any such remedial action.

The interactions described above illustrate certain exemplary embodiments which enable an administrator to scan a client when that client is active in the client role. To achieve that aim, once the administrator has intercepted the client request, it does not need to concern itself with the fate of the transaction with the external computer 30 which that request was seeking to initiate. To perform the scan the administrator need only ensure that the client remains 'open'—i.e. operating in a mode in which it is waiting for a response to its request for a service—for long enough for the administrator to scan the client and perform any remedial action. Where the client in question operates in a manner which would not, in the event of its traffic being intercepted, continue to remain open for long enough to perform a scan, the administrator can actively interact with the client request to procure the client's continued availability for the duration of the certain period of time. This can be done, for example, by employing network address translation to adopt the alias of the computer 30, and returning packets executing appropriate protocol methods at appropriate instants in time (such as, for example, various packets required in accordance with the TCP/IP protocols, on top of which applications protocols such as HTTP are implemented). Thus, where the client remains open without such aliased interactions, the administrator has the option of simply blocking traffic from the client at the router 14 (or, in the embodiment where the traffic passes through the administrator directly, the blocking can be done by the administrator) until the scan has indicated that the client is safe. Alternatively, the administrator may simply inject additional packets containing scanning code into the traffic returned from the computer 30, and perform the scan invisibly while the client transacts with the external computer.

In the case of the outright block, the operator may become aware of it happening, become irritated and seek, on future occasions, to avoid being scanned. In the case where scanning takes place while the requested web page is returned, the client remains potentially vulnerable and exposed to attack. It may, therefore, depending upon policy and other issues, be desirable for the administrator to do more, and one optional set 230 of further operations performed by the daemon 200 is illustrated in FIG. 2, running in parallel with the steps 202 to 208.

Figure 4:
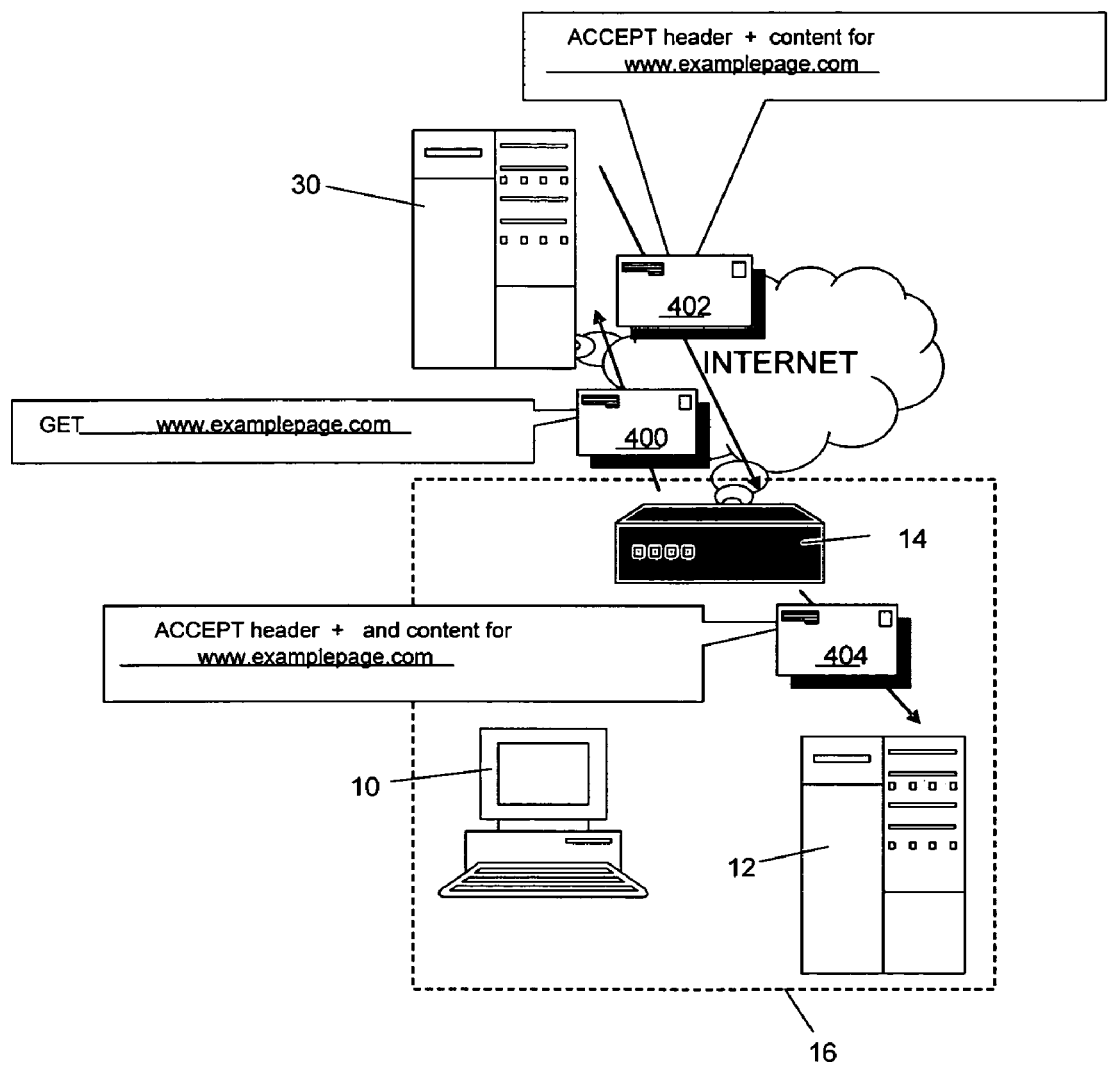
FIGS. 4 and 5 are schematic illustrations of a scenario illustrating certain further exemplary embodiments.

Referring now to FIGS. 2 and 4, once the client request has been intercepted and relayed by the router 14, the request is transmitted at step 210 to the external computer 30. This is illustrated in the scenario of FIG. 4 by the transmission of message 400. The external computer 30 then replies to the request, for example, in accordance with normal implementation of HTTP, sending packets of data containing headers and content (i.e. the web page) back to the requesting client—illustrated by transmission of message 402.

At step 212 the daemon operates to cause the administrator to act as a proxy for the client in the remainder of the transaction, by intercepting these packets at the router 14 and directing them to the administrator 12, illustrated in FIG. 4 as message 404. The administrator 12 then continues to conduct the transaction with the server running on the external computer 30, for example, as mentioned above, by sending the appropriate TCP/IP packets during transfer of the content in accordance with HTTP, and thereby ensuring the continuance of the transaction and, ultimately, receipt by the administrator 12 of a copy of the webpage requested by the client on user 10.

Figure 5:
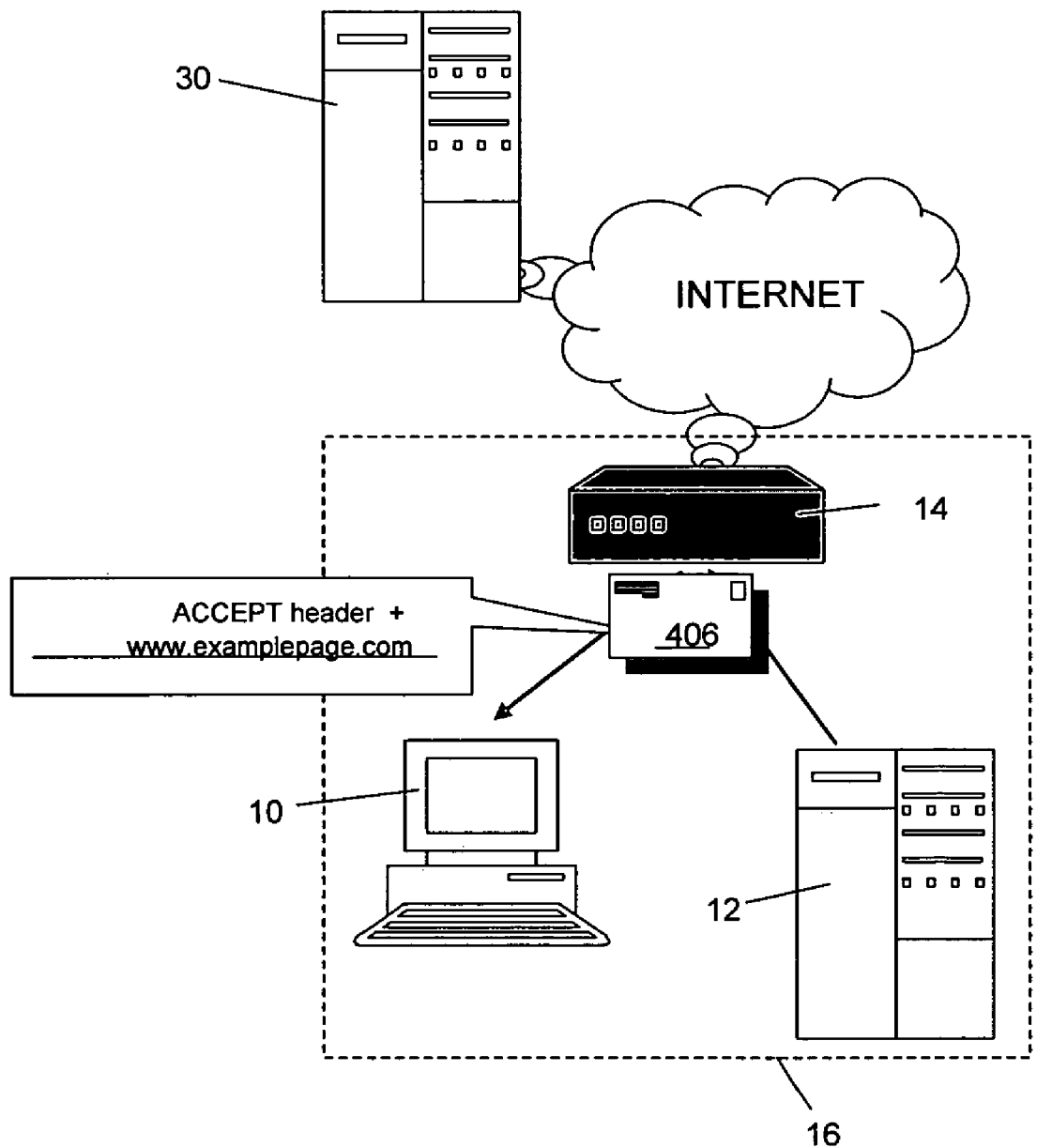

Referring additionally to FIG. 5, a further option which may be implemented by the administrator is that it may act as a proxy for the server running on the external computer 30, for example by sending the appropriate TCP/IP packets and HTTP packets to the user 10. At step 214, which is temporally coincident with completion of any remediation measures in step 208, the web page which has been obtained and cached by the administrator on behalf of the client is then returned to the client via the router 14, illustrated in FIG. 5 by message 406.

In a further embodiment that may be useful in the event of the use of secure protocols containing encrypted packets (such as https, for example), the administrator may return a re-routing message, while the scan is taking place, and provided no vulnerabilities were found, then initiate the normal connection originally sought on behalf of the client.

These optional steps may provide a number of advantages. With regard to the operation of the administrator as a proxy for the client on user 10, it diverts the traffic from the external computer 30 away from the client on the user until after the vulnerability scan of that client has been completed; thus it prevents a potentially vulnerable client interacting with a potential source of malicious code to exploit any vulnerability. Secondly, by conducting the transaction on behalf of the user client, and acting as a proxy for the server running on the external computer 30, the administrator 12 is able to return the requested webpage to the user client following scanning and remediation of vulnerabilities has taken place, reducing disruption caused by the scan. This means that an operator of the user client may be less likely to be irritated by the scanning process, and avoiding hostility on the part of human operators to it makes it less likely that they will take active steps to avoid a scan and any remedial measures in future. This reasoning also applies to the administrator.

In certain embodiments, the traffic from the external computer could simply be blocked at router 14 until scanning and remediation have been completed, either in conjunction with an error message or without one. In yet a further embodiment, the transaction with the external computer 30 may simply be allowed to continue unimpeded, for example this may be allowed if the requested web page is on a list of low risk external sites. Following completion of the transaction, and in parallel with remediation step 208, the administrator then returns the cached page to the user 10, so that, when the optional steps 212 and 214 are implemented, the user is unlikely to detect any interference with their client request.

Within the context of this specification malicious code includes code which causes a host computing entity for that code (once assimilated) to operate either in a manner that is either contrary to the operator's wishes or damaging to the entity, or contrary to the wishes of an administrator of a network in which the computing entity is located. For example, one kind of malicious code assimilable by a host computing entity may cause a deleterious effect upon the performance of either: the aforesaid host (including code which enables a remote operate to take control of that host); one or more other hosts; or a network of which any of the above-mentioned hosts are a part. A characteristic effect of some kinds of malicious code is that it propagates either through self-propagation or through human interaction. Thus for example, code may act by becoming assimilated within a first host, and subsequent to its assimilation may then cause deleterious effects within that first host, such as corruption and/or deletion of files or the provision of privileges to an unauthorised person. In addition the code may cause self-propagation to one or more further hosts at which it may then cause similar corruption/deletion and further self-propagation. Alternatively the code may merely be assimilated within the first host and cause no deleterious effects whatsoever, until it is propagated to one or more further hosts where it may then cause such deleterious effects, such as, for example, corruption and/or deletion of files. In yet a further exemplary scenario, code may for example become assimilated within a first host, and then cause itself to be propagated to multiple other hosts within the network. The code may have no deleterious effect upon any of the hosts by whom it is assimilated, however the self-propagation through the network per se may be of a sufficient magnitude to have a negative effect on the speed of "genuine" network traffic, so that the performance of the network is nonetheless affected in a deleterious manner. This elucidation of the nature of malicious code is illustrative, rather than definitive of the breadth of the term malicious code.

What is claimed is:

1. A method of managing a network having one or more user computing entities and one or more administrative computing entities, the method comprising:
    monitoring, at an administrative computing entity, network traffic from a user computing entity, wherein the administrative computing entity monitors traffic remotely, via a further computing entity;
    detecting a client request, sent from the user computing entity, and addressed to a third party computing entity;
    determining, at the administrative computing entity, an identity of an application on the user computing entity that initiated the client request;
    accessing a vulnerability log based on the identity of the application, to determine if a known vulnerability exists; and
    initiating scanning of the user computing entity for vulnerabilities by injecting code, adapted to scan the user computing entity, into traffic transmitted to the user computing entity from the third party computer entity when a known vulnerability exists.

2. A method according to claim 1 wherein the further computing entity is a router.

3. A method according to claim 2 wherein the router relays traffic to the administrative computing entity.

4. A method according to claim 1 wherein the further computing entity is a transparent proxy.

5. A method according to claim 1, further comprising:
    on detection of the client request from the user computing entity, determining, on the basis of a policy, whether to scan the user computing entity.

6. A method according to claim 5 wherein scanning the user computing entity is performed to establish vulnerabilities to attack via one or more specified protocols.

7. A method according to claim 6 wherein scanning of the user computing entity is performed to establish vulnerability to the one or more protocols at different levels in a hierarchy.

8. A method according to claim 1 further comprising:
    upon detection of the client request, blocking traffic between the user computing entity and the third party computing entity.

9. An administrative computer entity connected to a user computing entity to at least:
    monitor, at the administrative computer entity, network traffic from the user computing entity, wherein the administrative computer entity monitors traffic remotely, via a further computing entity;
    detect, using a hardware processor, a client request, sent from the user computing entity, and addressed to a third party computing entity;
    determine an identity of an application on the user computing entity that initiated the client request;
    access a vulnerability log based on the identity of the application, to determine if a known vulnerability exists; and
    initiate a scan of the client computing entity for vulnerabilities by injecting code, adapted to scan the user computing entity, into traffic transmitted to the user computing entity from the third party computer entity when a known vulnerability exists.

10. An administrative computer entity according to claim 9 further adapted to implement a policy which determines, upon detection of the client request, whether the user computing entity is to be scanned.

11. An administrative computer entity according to claim 10, wherein the policy provides that the scan takes place if the user computing entity has not been scanned since an occurrence of a specified event.

12. An administrative computer entity according to claim 11, wherein the specified event includes a passing of a predetermined interval of time since a previous scan.

13. An administrative computer entity according to claim 11 wherein the specified event includes a performance of a scan to remedy a specified vulnerability.

14. An administrative computer entity according to claim 9 adapted, upon detection of the client request, to block traffic between the user computing entity and the third party computing entity.

15. A system of managing a network, comprising:
    a network device to detect a client request sent from a user computing entity of the network and addressed to a third party computing entity, wherein the network device detects the client request and is remote from the user computing entity;
    means, at the network device, for determining an identity of an application on the user computing entity that initiated the client request;
    means for accessing a vulnerability log based on the identity of the application, to determine if a known vulnerability exists; and means for initiating scanning of the user computing entity for vulnerabilities by injecting code, adapted to scan the user computing entity, into traffic transmitted to the user computing entity from the third party computer entity when a known vulnerability exists.

16. The system according to claim 15, further comprising:

means for determining, upon detection of the client request, whether to scan the user computing entity, the determination based on a policy.

17. A method according to claim 1, further comprising:

determining when the user computing entity was last scanned for vulnerabilities; and determining when the known vulnerability was logged, wherein scanning the user computing entity for vulnerabilities is performed when the known vulnerability was logged after the user computing entity was last scanned for vulnerabilities.

18. A method according to claim 1, wherein initiating scanning of the user computing entity comprises causing the administrative computing entity to scan for the vulnerabilities.

19. A method according to claim 1, wherein initiating scanning of the user computing entity comprises causing the user entity to scan for the vulnerabilities.

* * * * *